United States Patent
McAuliffe

[15] 3,692,270
[45] Sept. 19, 1972

[54] SEAT LATCH MECHANISM
[72] Inventor: Gerald N. McAuliffe, Lincoln, Nebr.
[73] Assignee: Outboard Marine Corporation, Waukegan, Ill.
[22] Filed: May 5, 1971
[21] Appl. No.: 140,343

[52] U.S. Cl. ............248/384, 188/109, 248/397, 297/217, 292/DIG. 4
[51] Int. Cl. ...........................F16d 65/14, E05c 3/00
[58] Field of Search......248/371, 372, 373, 382, 384, 248/396, 397, 399, 407, 408, 409, 421, 423; 297/326, 327, 328, 217; 188/109

[56] References Cited
UNITED STATES PATENTS

| | | | |
|---|---|---|---|
| 2,748,835 | 6/1956 | Barecki | 248/397 |
| 2,750,010 | 6/1956 | Day | 188/109 |
| 3,259,203 | 7/1966 | Ryskamp | 188/109 |
| 3,332,522 | 7/1967 | Dence | 188/109 |
| 3,480,249 | 11/1969 | Lie | 297/328 |
| 3,519,240 | 7/1970 | Swenson | 248/399 |

Primary Examiner—Marion Parsons, Jr.
Attorney—Robert E. Clemency, John W. Michael, Gerrit D. Foster, Bayard H. Michael, Paul R. Puerner, Joseph A. Gemignani, Andrew O. Riteris, Robert K. Gerling and Spencer B. Michael

[57] ABSTRACT

Disclosed herein is a seat which is mounted on a vehicle frame for pivotal movement relative to an in-use position, together with a parking brake operable to prevent vehicle movement upon movement of the seat through a first predetermined distance from the in-use position, and a latch mechanism on the seat and on the frame and including first means for preventing movement of the seat through the first predetermined distance from the in-use position, and second means selectively movable between first and second positions, and being operable, when in the first position, for preventing limitation of movement of the seat by the first means, whereby to allow pivotal movement of the seat from the in-use position beyond the first predetermined distance, and for preventing movement of the seat through a second predetermined distance greater than the first predetermined distance from the in-use position and, when in said second position, for permitting seat movement prevention by the first means and for effecting movement of the second means to the first position upon movement of the seat toward the in-use position from a position at the first predetermined distance from the in-use position.

19 Claims, 3 Drawing Figures

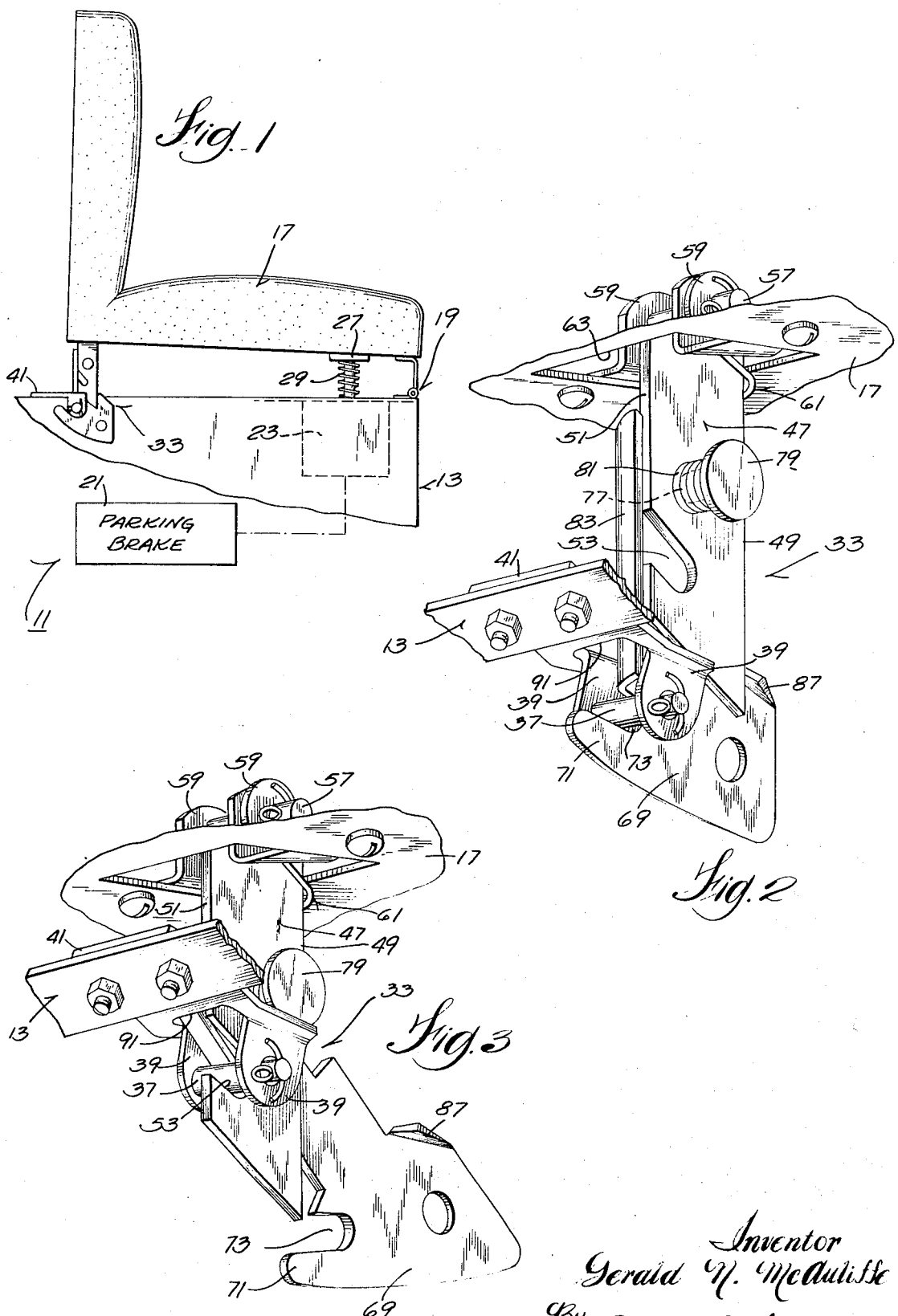

SEAT LATCH MECHANISM

BACKGROUND OF THE INVENTION

The invention relates to vehicles, such as golf carts and small industrial vehicles, and to parking brake systems for such vehicles, which parking brake systems are controlled, at least in part, by seat movement. The invention also relates to latch mechanism which control or affect such seat movement.

In the past, small vehicles, such as golf carts, have included parking brakes which would automatically engage whenever the user removes his weight from the driver's seat. Such engagement occurred in cooperation with movement of the seat through a distance from an in-use or weighted position.

One example of a vehicle parking brake system which is so operable is disclosed in the Von Seggern application Ser. No. 120,130 (Attorney's Docket No. 1362) filed on Mar. 2, 1971, and entitled "Automatic Hydraulically Operated Seat Brake", which disclosure is incorporated herein by reference. Another prior example of a vehicle parking brake system is disclosed in the Dence U.S. Pat. No. 3,332,522 issued July 25, 1967.

SUMMARY OF THE INVENTION

The invention provides a vehicle with a latch mechanism for a seat which is operable associated with a parking brake and operable, when in an in-use position, to release a parking brake and which is biased away from the in-use position toward a spaced position operable to effect parking brake engagement. The latch mechanism of the invention is selectively arrangeable in a normal operating position and in a position affording vehicle towing and is operable, when in the normal operating position and when a person leaves the seat, to permit sufficient movement of the seat from the in-use position so as to effect engagement of the parking brake and thereby prevent unwanted vehicle movement, and to thereafter limit further movement of the seat away from the in-use position. In addition, the latch mechanism is operable, when the latch mechanism components are in the towing position and when the seat is unoccupied, to prevent movement of the seat away from the in-use position through a distance which is effective to engage the parking brake, whereby to retain the parking brake in released condition and thereby afford towing of the vehicle as may be desired. Still further, the latch mechanism is additionally operable, when the components are initially in the towing position and, when the seat is subsequently moved to the in-use position, to cause displacement of the components to the normal operating position.

The seat latch mechanism in accordance with the invention therefor advantageously serves, when in the normal operating position, to automatically afford release of a parking brake in response to occupation of a seat and to afford engagement of the parking brake whenever the occupant leaves the seat, thereby preventing a runaway vehicle condition. The latch mechanism can also be advantageously arranged to retain the seat, even though unoccupied, in a partially raised position which retains the parking brake in released condition, thereby permitting towing by another vehicle. However, upon movement of the seat to the in-use position, the latch mechanism automatically reorganizes itself to the normal operating position which affords automatic engagement of the parking brake whenever an occupant leaves the seat.

In accordance with one embodiment of the invention, the latch mechanism includes a latch member or bar which is pivotally mounted on the seat and which includes a notch arranged to engage a strike on the vehicle frame so as to retain the seat in a partially raised position which is ineffective to engage the brake and thereby affords towing. The latch mechanism further includes a hook member which includes a hook portion and a flange and which is mounted on the latch bar for movement between a normal operating position and a position affording towing. When the hook member is in the normal operating position, the hook portion is located to engage the strike and to limit movement of the seat from the in-use position after the brake has been engaged. At the same time, the flange is located in covering or blocking relation to the notch to prevent entry therein of the strike and to prevent pivotal movement of the hook member relative to the latch member. When the hook member is in the position affording towing, the hook portion is displaced so as to prevent engagement thereby with the strike and the flange is located clear of the entrance to the notch in the latch bar so as to permit entrance therein of the strike to retain the seat in a partially raised position with the brake released, thereby affording towing. In addition, the flange is located in position for engagement by the strike so that, upon seat movement to the in-use position, the hook member will be cammed by the strike from the towing position to the normal operating position.

One of the principal objects of the invention is the provision of a vehicle including a latch mechanism for a seat operably associated with a parking brake so as to afford, when the latch mechanism components are in one condition, disengagement or release of the parking brake when the seat is occupied and engagement of the brake when the seat is unoccupied and to afford, when the latch mechanism components are in another condition, maintenance of the parking brake in a released condition so as to enable towing of the vehicle even though the seat is unoccupied.

Another of the principal objects of the invention is the provision of a seat latch mechanism including a hook member selectively movable between a normal operating position and a position affording towing and including a flange which is located, when the hook member is in the normal operating position, in blocking relation to a strike receiving notch in a latch member connected to the seat and which is located, when the hook member is in the towing position, clear of the notch to permit entrance therein of the strike and in position for engagement with the strike to cam the hook member from the towing position to the normal operating position upon movement of the seat to the in-use position.

Another object of the invention is the provision of a vehicle having a seat operated parking brake and a seat latch mechanism which is of the type referred to in the preceding paragraphs, which is economical to manufacture, and which will provide a long and useful life.

Other objects and advantages of the invention will become known by reference to the following description and accompanying drawings.

DRAWINGS

FIG. 1 is a fragmentary elevational view of a vehicle including a seat latch mechanism embodying various of the features of the invention.

FIG. 2 is an enlarged perspective view of the components of the seat latch mechanism included in the vehicle shown in FIG. 1.

FIG. 3 is an enlarged perspective view similar to FIG. 2 and illustrating the seat latch components in another position.

GENERAL DESCRIPTION

Shown in FIG. 1 is a fragmentarily illustrated vehicle 11, such as a golf cart or small industrial vehicle, which vehicle includes a frame 13 and a seat 17 movably mounted on the frame 13. While other constructions can be employed, in the illustrated construction, the seat 17 is pivotally connected, at its front, to the frame 13 by a pivot 19 and is movable relative to the frame 13 and to an in-use position with the rear of the seat 17 in adjacent relation to the frame 13.

Controlled by seat movement is a parking brake 21 which is shown schematically in FIG. 1 and is suitably mounted on the frame 13. The parking brake 21 is actuated in response to operation of a schematically shown mechanism 23 including an actuating lever or member 27 which is carried by the frame 13, which is operably connected to the parking brake 21, and which engages the undersurface of the seat 17. When the seat is in the in-use position, i.e., when an operator is sitting on the seat, the actuating member 27 is depressed and the parking brake 21 is released to afford vehicle movement.

However, when the operator removes his weight from the seat 17, the seat 17 rises from the in-use position permitting following movement of the actuating member 27. When the seat has moved a predetermined distance from the in-use position, the accompanying movement of the actuating member 27 is effective to apply or engage the parking brake 21 to prevent vehicle movement. As already indicated, parking brake constructions of the general type herein contemplated are more fully described in the previously identified Von Seggern application and Dence U.S. Pat. No. 3,332,522.

In order to cause the seat 17 to rise from the in-use position when an operator is not in the seat 17, and thereby to normally insure that the parking brake 21 will be engaged when the seat 17 is unoccupied, means are provided for biasing the seat 17 away from the in-use position. Various means can be employed. In the illustrated construction, a compression spring 29 is located in telescopic relation to the actuating member 27 and between the frame 13 and the seat 17.

In accordance with the invention, there is provided a seat latch mechanism 33 which is alternately operable either to permit the seat to swing upwardly through the predetermined amount so as to engage the parking brake 21 and thereafter to limit the amount of permitted upward seat travel past the predetermined distance from the in-use position when the operator leaves the seat 17 or, in the event that it is desired to tow the vehicle without anyone in the seat, to retain the seat 17 in a position located less than the predetermined distance from the in-use position so that the parking brake 21 will be maintained in a released condition.

More specifically in accordance with the invention, the latch mechanism or assembly 33 includes components on each of the frame 13 and the seat 17 and comprises first means operable to prevent movement of the seat 17 through the predetermined distance from the in-use position which is effective to engage the parking brake 21 and thereby allow the parking brake 21 to remain in released condition, together with second means which is selectively movable between first and second positions in which the latch mechanism components are respectively arranged to provide normal operation and to facilitate towing. More specifically, the second means is operable, when in the first or normal operating position, to render ineffective the first means for preventing movement of the seat 17, whereby to allow pivotal movement of the seat 17 from the in-use position beyond the predetermined distance and thereby to engage the parking brake 21, and for preventing movement of the seat 17 beyond a second predetermined distance greater than the brake engaging predetermined distance from the in-use position. In addition, the second means is operable, when in the second or towing position, to permit the first means to prevent such seat movement under the influence of the spring as would engage the parking brake 21 and, in response to movement of the seat toward the in-use position, to displace the second means from the second position to the first position. Thus, in the event that the vehicle 11 has been towed and the latch mechanism 33 is engaged such that the first means is operating to locate the seat 17 in a position below the predetermined distance which serves to engage the parking brake 21, and an operator subsequently sits on the seat 17, the resulting downward movement of the seat 17 causes the latch mechanism 33 to reorganize itself so that the second means moves to the first position and so that, upon removal of the operator from the seat, the latch mechanism 33 will block operation of the first means and will permit the seat 17 to travel beyond the predetermined distance to engage the parking brake 21 before being engaged by the second means.

While other constructions could be employed, in the illustrated construction, the first means for preventing seat movement through the predetermined distance which is effective to engage the parking brake 21 and thereby to permit towing includes a strike or lock pin 37 which is carried by a pair of spaced arms or legs 39 forming a part of a bracket 41 suitably fixed to the frame 13.

The illustrated first means also includes a latch member or bar 47 having forward and rearward edges 49 and 51, respectively, and an upwardly and rearwardly open notch 53 on the lower portion of the rearward edge 51, together with means mounting the latch bar 47 on the seat 17 for pivotal movement about an axis parallel to the strike 37 and with the notch 53 located for engagement with the strike 37 when the seat 17 is located in spaced relation from the in-use position at a distance less than the predetermined distance which is effective to engage the parking brake 21.

Various latch bar mounting means can be employed, and in the illustrated construction, the latch bar 47 is carried on a pivot 57 extending between a pair of spaced supports 59 fixed to the seat 17.

Means are also provided for biasing the latch bar 47 in the direction which is effective to engage the notch 53 with the strike 37 when the seat 17 is at the proper distance from the in-use position. While various arrangements can be employed, in the illustrated construction, such means comprises a torsion spring 61 extending around the pivot 57 and having one end (not shown) engaged with one of the supports 59 and the other end engaged with an upper portion of the forward edge 49 of the latch bar 47.

Means are also provided for limiting the permissable movement of the latch bar in the clockwise direction, as shown in FIG. 2, under the influence of the spring 61 to a position affording engagement of the strike 37 within the notch 53 when the seat is at the proper distance from the in-use position. While various arrangements can be employed, in the illustrated construction, such means can comprise engagement of an edge 63 on the seat 17 with an upper portion of the rearward edge 51 of the latch bar 47.

While other constructions can be employed, in the illustrated construction, the before mentioned second means includes, in addition to the before mentioned strike 37, a hook member 69 having, at the lower end thereof, a projecting hook shaped portion 71 defining, at least in part, a second upwardly and rearwardly open notch 73 adapted to engage or receive the strike 37, together with means mounting the hook member 69 from the seat 17 with the hook shaped portion 71 extending rearwardly and below the bottom of the latch bar 47 and for movement relative to a first or normal operating position which blocks entry of the strike 37 into the notch 53 and therefor renders the latch bar 47 inoperable to limit movement of the seat 17 and which also affords engagement of the hook portion 71 with the strike 37 to prevent further movement of the seat away from the in-use position after the seat has traveled beyond the distance which is effective to engage the parking brake 21. The hook member is also movable relative to a second or towing position in which the notch 53 is unblocked to afford receipt therein of the strike 37 and in which the hook member is arranged for displacement by the strike 37 to the normal operating position in response to seat movement to the in-use position.

While other constructions can be employed, the hook member mounting means includes the before mentioned latch bar 47 and means pivotally connecting the upper end of the hook member 69 to the latch bar 47 about an axis parallel to the pivot 57. The hook member mounting means also affords movement of the hook member 69 in the direction of the pivotal axis between the hook member 69 and the latch bar 47 and away from a position in adjacent relation to the latch bar 47. While various arrangements can be employed, in the illustrated construction, such hook member mounting means comprises an aperture (not shown) in the latch bar 47 and a stud or pin 77 extending from the upper portion of said hook member 69 and through the aperture in the latch bar 47, and including, at its end, an enlarged head 79.

Means are provided for releasably retaining the hook member 69 in the position of adjacent relation to the latch bar 47. While various arrangements can be employed, in the illustrated construction, there is provided a helical spring 81 extending between the latch bar 47 and the head 79 in telescopic relation to the pin 77.

Means are also provided for limiting movement of the hook member 69 away from the latch bar 47 along the axis of the pin 77. Various arrangements can be employed. For example, such hook member movement away from the latch bar 47 can be limited when the coils of the spring 81 come into contacting engagement with one another. Alternatively, one of the spaced legs or arms 39 of the bracket 41 supporting the strike 37 can be located either to cooperate with the spring arrangement just described or to operate independently of the spring 81 to engage the hook member 69 so as to limit such axial hook member movement away from the latch bar 47.

Means are also provided for limiting pivotal movement of the hook member 69 relative to the latch bar and thereby to establish the first or normal hook member operating position and the second or hook member towing position. Various arrangements can be employed. In the illustrated construction, means in the form of a flange 83 extending from the upper part of the rearward edge of the hook member 69 is provided to perform (when the hook member 69 is in the normal operating position in adjacent to the latch bar as shown in FIG. 2) the dual functions of blocking entrance to the notch 53 and of limiting both clockwise and counterclockwise movement of the hook member 69 relative to the latch bar 47.

Means are also provided for limiting movement of the hook member 69 relative to the latch bar in the clockwise direction when the hook member is spaced laterally from its adjacent position in relation to the latch bar 47. While various arrangements can be employed, in the illustrated construction, the forward lower portion of the hook member 69 includes a projection 87 which is engageable with the lower forward edge 49 of the latch bar.

Means are also provided for limiting pivotal movement of the hook member 69 relative to the latch bar 47, in the clockwise direction as seen in FIGS. 2 and 3, when the hook member 69 is laterally spaced from its adjacent position relative to the latch bar 47 and for displacing the hook member 47 from the position shown in FIG. 3 to the position shown in FIG. 2 when the seat 17 is moved toward the in-use position, as for instance, when an operator sits on the seat 17 after previous engagement of the latch bar 47 with the strike 37. While various arrangements can be employed, in the illustrated construction, such means comprises either the strike 37 or an edge 91 on the bracket 41 or on the frame 17 extending in spaced parallel relation to the strike 37 and a portion of the flange 83 which engages the strike 37 or edge 91 as the seat 17 is moved toward the in-use position.

In operation, when the hook member 69 is in the position of adjacent relation to the latch bar 47 and the seat 17 is empty, the strike 37 is engaged by the hook shaped portion 71 of the hook member 69, thereby locating the seat 17 in its fully raised position with the parking brake 21 engaged. When a driver or other person sits on the seat 17, the seat 17 is depressed to the in-use position, thereby depressing the actuating member 27 and releasing the parking brake 21. During movement of the seat 17 to the in-use position, the rearwardly and upwardly inclined upper edge of the notch 73 is cammed against the strike 37 to slightly pivot the latch mechanism 33 in the counterclockwise direction, as shown in FIG. 2, about the pivot 57 until the strike 37 slides vertically upwardly along the flange 83. As already noted, the flange 83 serves to block entrance of the strike 37 into the notch 53 in the latch bar 47.

When the operator subsequently leaves the seat 17, the seat 17 will return to the fully raised position under the influence of the spring 29 and thereby engage the parking brake 21. During such upward seat movement, the strike 37 rides downwardly along the flange 83 until engaged by the hook portion 71 of the hook member 69 to thereby limit further upward movement of the seat 17 above the in-use position.

If it is desired to tow the vehicle 11, the latch mechanism 33 can be manipulated to displace the hook member 69 laterally away from the latch bar 47 in the direction of the pin axis and against the influence of the spring 81. When the hook member 69 is thus moved away from the latch bar 47 so that the flange 83 clears the rear edge 51 of the latch bar 47, the hook member 69 can than be pivoted in the counterclockwise direction, as seen in FIGS. 2 and 3, to the position shown in FIG. 3, thereby uncovering the entrance to the notch 53 in the latch bar 47 and also locating the flange 83 either in engagement with, or in position for engagement with the strike 37 to cam the hook member 69 to the normal operating position upon seat movement to the in-use position. Assuming the seat 17 to be unoccupied, the seat 17 is then partially depressed so that the strike 37 rides up the bottom and rearward edges of the latch bar 47 and enters into the notch 53 after seat movement toward the in-use position has effected release of the parking brake 21. The latch mechanism 33 will remain in this position to permit towing until the latch mechanism 33 is manually manipulated to return the hook member 69 to the position shown in FIGS. 1 and 2 or until the seat 17 is caused to be returned to the in-use position.

In this regard, when the seat 17 is again moved to the in-use position, the flange 83 will engage the strike 37 to rotate the hook member 69 in the clockwise direction, as shown in FIGS. 2 and 3, relative to the latch bar 47 until the projection 87 engages the lower portion of the forward edge 49 of the latch bar 47, thereby to locate the flange 83 clear of the rearward edge 51 of the latch bar 47. Upon such clearance, the spring 81 will cause the hook member 69 to move laterally into adjacent relation to the latch bar 47, thereby moving the flange 83 into blocking relation to the notch 53 in the latch bar 47. Accordingly, when the seat 17 is again permitted to swing upwardly under the influence of the spring 29, as for instance, when the operator gets off the seat 17, the seat 17 will move upwardly until engaged by the hook shaped portion 71 of the hook member 69, and thereby also effecting engagement of the parking brake 21.

It is to be noted that both the lower edges of the latch bar 47 and the hook member 69 are inclined in the rearward and upward direction so as to swing the latch mechanism 33 forwardly (i.e., in the counterclockwise direction) about the pivot 57 when either edge is engaged by the strike 37. The pivotal mounting of the latch mechanism 33 about the pivot 37 also permits the latch mechanism 33 to be initially swung in the counterclockwise direction, as shown in FIG. 2, sufficiently to permit movement of the hook member 69 to initially locate the hook portion 71 below the strike 37.

Various of the features of the invention are set forth in the following claims.

WHAT IS CLAIMED IS:

1. A vehicle including a frame, a seat mounted on said frame for pivotal movement relative to an in-use position, a parking brake operable to prevent vehicle movement upon movement of said seat through a first predetermined distance from said in-use position, a latch mechanism on said seat and on said frame and including first means for preventing movement of said seat through said first predetermined distance from said in-use position, and second means selectively movable between first and second positions and operable, when in said first position, for rendering ineffective said first means for preventing movement of said seat, whereby to allow pivotal movement of said seat from said in-use position beyond said first predetermined distance, and for preventing movement of said seat from said in-use position beyond a second predetermined distance greater than said first predetermined distance and, when in said second position, for permitting seat movement prevention by said first means and for effecting movement of said second means to said first position upon movement of said seat toward said in-use position.

2. A seat latch mechanism including a frame, a seat mounted on said frame for movement relative to a first position, a latch mechanism on said seat and on said frame and including first means operable for preventing movement of said seat to a second position located at a first predetermined distance from said first seat position, and second means operable, when in a first position, for rendering ineffective said first means for preventing movement of said seat, whereby to allow movement of said seat from said first position beyond said second seat position, and for preventing movement of said seat from said first position beyond a third seat position located at a second predetermined distance from said first seat position greater than said first predetermined distance.

3. A seat latch mechanism in accordance with claim 2 wherein said second means is movable to a second position spaced from said first position and being operable, when in said second position, for permitting seat movement prevention by said first means.

4. A seat latch mechanism in accordance with claim 2 wherein said second means is movable to a second position spaced from said first position and being operable, when in said second position, for effecting movement of said second means to said first position upon movement of said seat toward said first seat position.

5. A seat latch in accordance with claim 3 including means biasing said seat away from said first seat position.

6. A seat latch in accordance with claim 3 wherein said latch mechanism includes a strike mounted on said frame and said first means includes a latch member having a notch, and means mounting said latch member on said seat with said notch in position for receipt of said strike when said second means is in said second position and said seat is spaced from said first seat position at a distance less than said first predetermined distance.

7. A seat latch in accordance with claim 6 wherein said latch member mounting means includes means affording pivotal movement of said latch member relative to said seat, means on said seat limiting pivotal movement of said latch member in the direction which is effective to engage said notch about said strike, and means biasing said latch member in said direction.

8. A seat latch in accordance with claim 3 wherein said latch member includes a strike mounted on said frame and said second means includes a hook member, and means mounting said hook member from said seat for movement relative to a position with said hook member located for engagement with said strike in response to movement of said seat beyond said first predetermined distance from said first seat position.

9. A seat latch in accordance with claim 8 wherein said means mounting said hook member from said seat includes a latch member pivotally mounted on said seat, and means connecting said latch member and said hook member for pivotal movement of said hook member relative to said latch member between first and second positions.

10. A seat latch in accordance with claim 9 and further including means biasing said latch member in the direction to engage said hook member with said strike, and means limiting movement of said latch member in said direction.

11. A seat latch in accordance with claim 9 wherein said latch member includes a notch located for receipt of said strike and including means on said hook member operable, when said hook member is in said first position, for blocking said notch and for limiting pivotal movement of said hook member relative to said latch member.

12. A seat latch in accordance with claim 9 including means on said latch member and on said hook member preventing pivotal movement therebetween in one direction beyond a predetermined amount of movement.

13. A seat latch in accordance with claim 9 wherein said means connecting said hook member and said latch member affords movement of said hook member away from a position in adjacent relation to said latch member in the direction axially of the pivotal connection between said latch member and said hook member, and means biasing said hook member toward said hook member position in adjacent relation to said latch member.

14. A seat latch in accordance with claim 13 including means on said frame and on said hook member limiting hook member pivotal movement in one direction relative to said latch member when said hook member is spaced from said hook member position in adjacent relation to said latch member.

15. A seat latch in accordance with claim 14 wherein said means on said frame and on said hook member limiting hook member pivotal movement in one direction comprises an edge on said frame in spaced parallel relation to said strike and flange on said hook member.

16. A seat latch in accordance with claim 9 wherein said means connecting said latch member and said hook member also permits relative movement between said hook member and said latch member in directions axially of the pivotal connection therebetween and including means limiting movement of said hook member away from said latch member in the direction of the axis of the pivotal connection between said hook member and said latch member.

17. A seat latch mechanism comprising a frame including a strike and a camming edge, a seat pivotally mounted on said frame, an element having spaced edges and a notch in one of said edges, means pivotally mounting said element on said seat, means biasing said element in the direction to engage said one edge against said strike, a member having an edge with a strike engaging hook portion, a flange extending from said strike engaging hook portion, and a projection spaced from said flange, means mounting said member on said element for pivotal movement about an axis parallel to said element axis and for movement along said parallel axis, and means urging said member into adjacent relation to said element with said hook portion extending below said element and with said flange extending in opposing relation to at least a part of said one edge and in blocking relation to said notch and with said projection adjacent to the other of said edges of said element.

18. A seat latch mechanism in accordance with claim 17 including means for limiting pivotal movement of said member relative to said element.

19. A seat latch mechanism in accordance with claim 17 including means for limiting movement of said member relative to said element along said axis.

* * * * *